June 16, 1953 G. W. VON HOFE Re. 23,668

LABEL APPLYING MECHANISM

Original Filed March 27, 1947

INVENTOR.
GEORGE W. VON HOFE

BY
Klein, Alexander & Pahl

ATTORNEYS

Reissued June 16, 1953 Re. 23,668

UNITED STATES PATENT OFFICE 23,668

LABEL APPLYING MECHANISM

George W. von Hofe, Bound Brook, N. J., assignor to New Jersey Machine Corporation, Hoboken, N. J., a corporation of New Jersey Original No. 2,578,329, dated December 11, 1951, Serial No. 737,540, March 27, 1947. Application for reissue February 11, 1953, Serial No. 336,463

58 Claims. (Cl. 216—55)

Matter enclosed in heavy brackets [ ] appears in the original patent but forms no part of this reissue specification; matter printed in italics indicates the additions made by reissue.

This invention relates to label applying machines and has for its principal object the provision of an improved means for applying labels to articles whose configuration or the place of application of the label thereto makes it desirable that the label first be shaped before it is mounted on the article.

In accordance with the above and other objects which will hereinafter become more apparent, the invention provides a transfer device having a label carrying surface substantially conforming to the article surface to which the label is to be applied and means for depositing the label on such surface of the transfer device.

Figure 1:
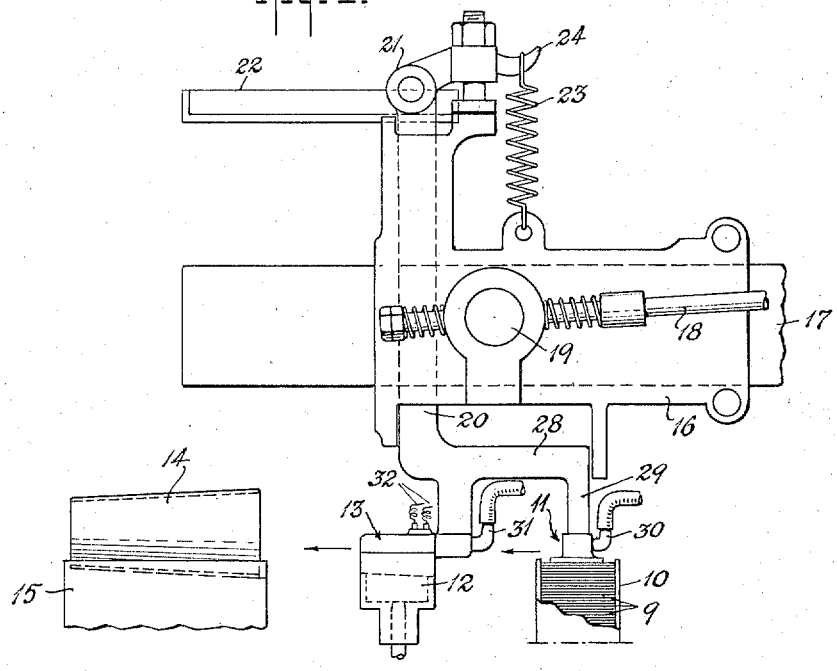
Figure 2:
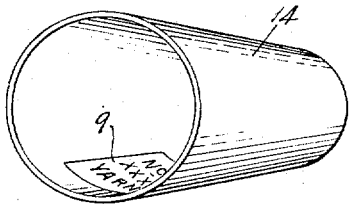
Figure 3:
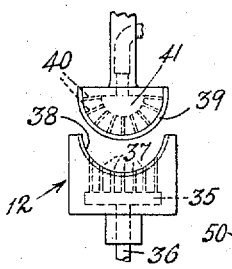
Figure 4:
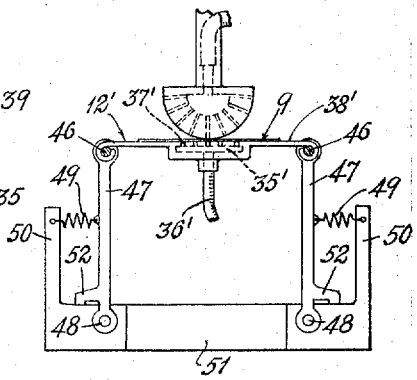
Figure 5:
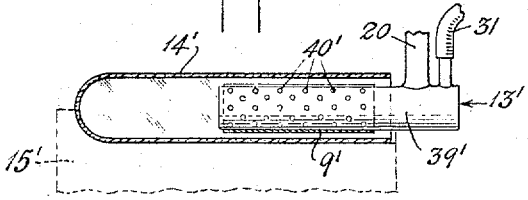
Figure 6:
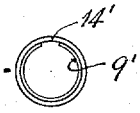

In the accompanying drawings, which illustrate examples of the invention without defining its limits, Fig. 1 is a fragmentary side elevational view of a label applying machine embodying the invention; Fig. 2 is a perspective view of an article having an interiorly applied label; Fig. 3 is a front elevational view of the transfer device and coacting label support shown in Fig. 1; Fig. 4 is a view similar to Fig. 3 illustrating another form of label support for carrying out the purposes of the invention; Fig. 5 is a side elevational view of another form of transfer device and showing it depositing a label in a suture tube and Fig. 6 is an end view of the article in Fig. 5 showing the label deposited therein.

The term "label" used throughout the following description is intended to include any sheet of material which is to be deposited on or in an article for the purpose of identifying the contents thereof, or for any other purpose. The label may have any desired form and may or may not have thereon a coating of adhesive material, such as, a suitable glue or heat activatable thermoplastic material, for the purpose of adhering the label to the article. Thus, wherein the specification and the claims it is stated that the label is applied to an article or surface, it is intended that the word "apply" shall include affixing, depositing, laying or placing the label on or in an article or on a surface. Also in practicing the invention, the labels may either be fed in the form of a continuous web from a supply roll in a well-known manner or be fed individually, as from a supply stack. In the machine illustrated in Fig. 1 of the drawings, the source of label supply is shown as an upright stack of individual labels 9 contained in a hopper 10 and coated on their lower faces with a heat activatable thermoplastic material. The hopper 10 may include any conventional elevating means for raising the stack of labels 9 at periodic intervals to thereby restore the top label in the stack to a predetermined height, and thus maintain the top labels at a substantially constant feeding level.

In accordance with the invention, the labels 9 are fed from the stack or store thereof on the support or elevating means of the hopper 10 to a support 12 by means of a pick-up device of the suction operated type which is designated generally in the drawings by the numeral 11. Suitable means may also be associated with the hopper 10 to facilitate the feed of the labels from the stack by the pick-up device 11. After a label 9 has been deposited upon the support 12, a label carrier or transfer device generally designated by the numeral 13, transfers the label in a reshaped condition from the support 12 to the article 14, which is mounted on a suitable support, such as for example, the article supporting means designated 15 in Fig. 1 of the drawings. Inasmuch as in this machine the labels to be applied to the articles by the transfer device 13 are obtained from the support 12 to which they are successively fed by the pick-up device 11, such support 12 may be stated to constitute a label supply or transfer station for the labels so transmitted to the articles.

The label applying machine in which the above mentioned devices are embodied, may be of any well-known type and for the purpose of illustrating the invention such parts have been shown as embodied in a labeling machine such as is described and illustrated in the Von Hofe Patent No. 2,227,816, issued January 7, 1941. In such a machine, there is provided a carriage 16 (see Fig. 1) slidably mounted on a horizontal guide rail 17 supported on the frame of the machine. The carriage 16 is reciprocated lengthwise of the rail 17 in predetermined timed sequence by mechanism exemplified in Fig. 1 of the drawings by the rod 18 which is pivotally connected at 19 to the carriage. A member or plunger 20 is slidably mounted on the carriage 16 and is vertically reciprocated thereon in properly timed relation with the associated parts by mechanism exemplified in Fig. 1 of the drawings by the roller 21 which is adapted to travel along a horizontally extending track 22 which is arranged to be raised and lowered to reciprocate the member 20. The downward movement of the member 20 may be facilitated by a vertically disposed spring 23 which is connected at its lower end to the carriage 16 and at its upper end to a lug 24 on the member 20. The spring 23 however, may be omitted in some instances and gravity alone depended upon to accomplish the downward movement of the member 20 when the track 22 is lowered. Secured to the lower end of the member 20 is the label carrier or transfer device 13. Also supported in predetermined spaced relation to the transfer device 13 on the member 20, is the pick-up or label feed device 11. The pick-up device may be mounted in any suitable fashion on the member 20, as by a supporting bracket 28, which is secured at one end to the member 20 and at its other end is provided with a depending portion 29 to the lower end of which is secured the pick-up device 11.

It will be understood from the parts of the label machine thus far described, that when in the operation of the machine, the parts are positioned as shown in Fig. 1, the track 22 is in a lowered position, the pick-up device 11 is in position to pick up a label from the stack or store of labels 9 and the transfer device 13 is in position to receive a label 9 which has been deposited on the support 12 in the previous operation of the carriage. Both the devices 11 and 13 are of the suction type and are connected by tubes 30 and 31, respectively, with a convenient source of suction which is controlled by properly timed valving means of any suitable type so that suction is effected at the label supporting surfaces of such devices while they are positioned as shown in Fig. 1 and until the labels carried thereby have been deposited on the support 12 and the article 14. When a label 9 has been drawn from the stack by the pick-up device 11 and a label has been taken from the support 12 by the transfer device 13, the track 22 is raised to elevate the member 20 and consequently the devices 11 and 13 with the labels thereon. The carriage is then caused to move to the left, as viewed in Fig. 1 of the drawings to bring the pick-up device 11 over the support 12 and the transfer device 13 into the open end of the article 14 which has previously been placed on the support 15 in label receiving position. The spacing of hopper 10, support 12 and support 15 is correlated with relation to the spacing of devices 11 and 13 on the member 20 to bring the parts accurately into the positions above described. When the parts are in the said positions the track 22 is lowered and the member 20 moves downwardly on the carriage 16 to thereby cause the pick-up device 11 to deposit the label carried thereby on the support 12 and to cause the transfer device 13 to deposit its label upon the interior surface of the article 14. When the deposition of the two labels has been completed, the suction in the devices 11 and 13 is discontinued and the latter are lifted with respect to the carriage 16 by the action of track 22 on the roller 21 and member 20. The labeled article 14 is then removed from the support 15 and the carriage 16 is retracted to bring the parts back to the positions shown in Fig. 1 of the drawings to repeat the operations above described.

The support 12 is provided with a label supporting surface 38 at which terminate a plurality of air passageways 37 that are in communication at their lower ends with a chamber 35 formed within such support (see Fig. 3). The chamber 35 is connected by means of a tube 36 with a source of air supply. Suitable valve means are provided to control the air supply to the chamber 35 so as to provide a condition of suction in such chamber and consequently at the surface 38 of the support when a label is to be delivered to such surface by the label pick-up or feeding device 11 and until such label is to be delivered to the transfer device 13. The valve means should be also adapted to deliver compressed air into the chamber 35 to blow the deposited label 9 into contact with the label carrying surface of the transfer head 13 when the latter is properly positioned in label receiving position with relation to the support 12. Due to the fact that a label on support 12 is deposited thereon so that its thermoplastic coating is in engagement with surface 38 and the fact that the label carrying surface of the transfer device 13 is heated in any suitable manner, as by providing the device 13 with a conventional electrical type of heater located in an electrical circuit and indicated by the wires 32, it is preferred that the transfer device 13 should not contact with the label on the support but in its pick-up position be slightly spaced therefrom to prevent the label's adherence to the support. It is contemplated however, to bring the device 13 into contact with the support when the label is not provided with a thermoplastic coating, in which case the said valve means may be arranged merely to cut off the suction to the chamber 35 and consequently surface 38 when the device 13 comes into engagement with the label resting on support 12. The surface 38 has a concave shape and conforms substantially to the shape of the label carrying surface 39 of device 13. Surface 39 in turn substantially conforms to the interior surface of the article 14 on which the label 9 is to be deposited. A label picked up by device 13 is maintained on surface 39 by suction created through the air passageways 40 terminating at one end in such surface and communicating at their other ends with a chamber 41 which is connected by tube 31 to a source of suction controlled by valve means of any suitable type so that when a label 9 is picked up from support 12 and until it is deposited on article 14, such suction will be effective at surface 39 to maintain label 9 properly in position thereon.

It will be understood from the foregoing, that when a label 9 is deposited on surface 38 of support 12, the suction effective at such surface will cause the label to adhere snugly thereto and take a concave shape similar to that of surface 38. The label 9 is thus preshaped on support 12 prior to its delivery to the transfer device 13. When device 13 is lowered so that it enters into the recess defined by surface 38, with its label carrying surface 39 spaced slightly from the exterior face of the label, compressed air through tube 36, chamber 35 and air passageways 37 will blow the preshaped label into contact with surface 39 where it will be held by the suction effective at such surface at that time. The transfer device 13 with the shaped label 9 thereon, will then be lifted from the support 12, shifted by the carriage 16 into the mouth of the article 14 and then lowered to deposit the label upon the concaved interior surface of article 14. During the travel of the transfer device 13 from support 12, to the article 14, the label 9 is heated by the heating means 32 carried by device 13 to adhesively activate the thermoplastic coating on such label. Consequently when the transfer device 13 is lowered at the applying station to bring the label 9 with its heat activated thermoplastic coating into engagement with the interior surface of article 14, the label will be caused to adhere to such surface of the article. At the proper momene suction is cut off in the transfer device 13 and the latter is returned to support 12 in the manner previously described to transfer another preshaped label from such support to a succeeding article.

Instead of shaping the label 9 prior to its application to the article by means of rigid surfaces such as the aforementioned surfaces 38 and 39, it is within the contemplation of the invention to shape the label on surface 39 of the transfer device 13 by any other suitable means. Thus, in Fig. 4 of the drawings, there is illustrated a flexible band or strap 12′ made of any suitable material, such as rubber, and supported at its ends on pins 46, 46 so as to be positioned across the path of travel of the transfer device 13 when it is lowered to pick up a label 9. The pins 46, 46 are provided on the upper ends of two movable standards 47, 47 which are pivotally connected at 48, 48 to the base of a U-shaped bracket 51 mounted on the machine in any suitable manner. The standards 47, 47 are maintained in substantially vertical positions by means of springs 49, 49 which are connected to the arms 50, 50 of bracket 51. Between its ends, the strap 12′ is provided with a plurality of perforations 37′ which communicate with a chamber 35′ formed in the central portion thereof. The chamber 35′ is connected by means of a pipe or tube 36′ with a source of suction controlled to provide suction in the chamber 35′ and consequently at the upper surface 38′ of strap 12′ when the label 9 is deposited on the latter and until such label is picked up by the transfer device 13. In this operation, it will be understood that the central portion of the strap 12′ will be depressed by the transfer device 13 during the latter's downward movement. During such movement of the transfer device 13, the strap 12′ will be shaped to conform to the shape of the label carrying surface 39 of the transfer device, thus wrapping the label about such surface, the standards 47, 47 pivoting toward each other to enable this shaping of strap 12′ to take place. As the transfer device is raised to carry off the label 9 in the manner previously described, support 12′ is returned to its normal raised position and standards 47, 47 return to their normal positions under the influence of springs 49, 49. Stop members 52, 52 on standards 47, 47 restrict the return movements of the latter so that they do not go beyond a vertical position.

It is also within the contemplation of the invention to provide the label carrying surface of the transfer device with any shape which will accomplish either the application or the delivery of the label to an article. Thus, in Fig. 5 of the drawings, the label carrying surface 39′ of the transfer device 13′ is provided with a cylindrical shape to enable it to carry labels which should be first shaped into the form of a cylinder before insertion into articles, such as, the suture or gut tube 14′. In applying labels to articles of this type, it is not necessary that the labels be given a coating of adhesive or thermoplastic material, it being merely sufficient to rely on the natural resiliency of the label material to maintain it in the position it will assume in the article when the suction at the surface 39′ of the transfer device is cut off. Fig. 6 shows the label 9′ positioned on the article 14′, in the position it assumes after release of the vacuum in member 13′ has permitted it to snap out against the wall of the article. The label 9′ may be wrapped around the cylindrically-shaped surface 39′ of the transfer device 13′ by means of the apparatus shown in Fig. 4 of the drawings, or by any other suitable means, the label being held in position thereon by the suction applied through ports 40′.

It will be apparent to those skilled in the art that changes and modifications other than those above described may be made without departing from the spirit of the invention or the scope of the appended claims.

I claim:

1. In a labeling machine, a label supply station, means spaced from said station for supporting articles to be labeled, a vacuum device adapted to carry from said supply station to the article to be labeled a label shaped to the label carrying surface of such device, said surface having a shape other than flat and substantially conforming to the shape of the article surface to which the label is to be applied, and means at said label supply station for supplying to said device a label having a form other than flat and shaped to substantially conform to the shape of said surface thereof.

2. In a labeling machine, a vacuum device adapted to carry a label shaped to the label carrying surface thereof from a transfer station to an article, said surface having a shape other than flat and substantially conforming to the shape of the article surface to which the label is to be applied, a source of label supply, means for advancing the terminal label in said supply to the label transfer station, means at the transfer station for supplying to said device a label shaped to said surface thereof and means for synchronously actuating said device and said advancing means to carry a shaped label from the transfer station to an article and to advance a label from said supply to the transfer station during the same time.

3. In a labeling machine, means for supporting a source of label supply, means spaced from said supply and having a label supporting surface of a shape other than flat and substantially conforming to the shape of the article surface to which the label is to be applied, means for feeding the terminal label in said supply to said surface, means coacting with said label supporting surface to cause a label to assume the shape of the latter, means for delivering the label in its thus shaped form to the article and means for synchronously actuating said feeding means and said label delivery means to feed a label to said surface and to deliver a shaped label to an article during the same time.

4. In a labeling machine, means for supporting a source of supply of labels in flat form, means for feeding the terminal label in said supply to a transfer station spaced from such supply, means at said transfer station for shaping the label from a flat form to a form other than flat and substantially conforming to the shape of the article surface to which the label is to be applied, means *having a label carrying surface substantially conformed to the shape of the reshaped label* for delivering the label in its thus shaped form *from said transfer station* to the article *and for applying the reshaped label to the article*, and means for synchronously actuating said feeding means and said label delivery means to feed a label to said transfer station and to deliver a shaped label to an article during the same time.

5. In a labeling machine, means for supplying labels in flat form from a source of label supply, means for shaping the labels into a form other than flat and substantially conforming to the shape of the article surface to which the label is to be applied, means *having a label carrying surface substantially conformed to the shape of*

*the reshaped label* for delivering the label in its thus shaped form *from said shaping means* to the article *and for applying the reshaped label to the article*, and means for synchronously actuating said supplying means and said label delivery means to supply a label in flat form to said shaping means and to deliver a shaped label from said shaping means to an article during the said time period, said shaping means being operable at the end of each such period.

6. In a labeling machine, means for supporting a source of label supply, means spaced from said supply and having a label supporting surface of a shape other than flat and substantially conforming to the shape of the article surface to which the label is to be applied, a vacuum picker for feeding labels from said supply to said surface, means for shaping the label on said surface and holding the label in shaped condition thereon, means for transferring the label in its thus shaped form from said surface to the article, and means for synchronously actuating said vacuum picker and said transfer means to feed a label from said supply to said surface and to transfer a shaped label from said surface to an article during the same time.

7. In a labeling machine, means for supporting a source of label supply, means having a label supporting surface of a shape other than flat and substantially conforming to the shape of the article surface to which the label is to be applied, a vacuum picker for feeding labels from said supply to said surface, means for shaping the label on said surface and holding the label in shaped condition thereon, a vacuum device for transferring the label in its thus shaped form from said surface to the article, said device having a label carrying surface conforming in shape to the shape of said supporting surface, and means for synchronously actuating said vacuum picker and said vacuum device to feed a label from said supply to said surface and to transfer a shaped label from said surface to an article during the same time.

8. In a labeling machine, a label supply station, means spaced from said station for supporting articles to be labeled, a vacuum device adapted to travel from said supply station to said article supporting station and having a label carrying surface shaped other than flat and substantially conforming to the shape of the article surface to which the label is to be applied and means separate from said vacuum device and located at said label supply station for shaping a flat label on said surface into conformity with the latter.

9. In a labeling machine, a vacuum device having a predetermined path of travel and having a reciprocal movement along a path transverse to its path of travel, a label carrying surface of a curved configuration which substantially conforms to the shape of the article surface to which the label is to be applied, and means for shaping a flat label on said surface including a flexible strap in the path of such reciprocal movement of said device and adapted to wrap a label positioned thereon on such surface during such reciprocal movement of said device.

10. In a labeling machine, the combination of article supporting means at a label applying station for positioning hollow articles to be labeled in label receiving position thereat, a vacuum device for delivering labels to the article comprising a support, a vacuum head mounted in offset position on said support and having a label carrying surface of a configuration conforming to the shape of the article surface to which the label is to be applied, means separate from said vacuum head and coactable with the latter for shaping a flat label on said surface into conformity with the latter, and means for actuating said device to carry the thus shaped label into the interior of the article for application thereto.

11. In a labeling machine, means for supporting a source of label supply, means spaced from said source for supporting articles to be labeled, means to feed an unactivated adhesive coated label in a flat condition from said source to a point intermediate the latter and said article supporting means, means at said intermediate point to shape the flat label to the contour of the label supporting surface of transmitting means, said surface having a form other than flat and substantially conforming to the shape of an article surface to which the label is to be applied, means to transmit the shaped label to said article supporting means and to activate the adhesive material on such shaped label during such portion of its travel, and means for synchronously actuating said feeding means and said transmitting means to feed a label from said source to said intermediate point and to transmit a shaped label from said intermediate point to an article during the same time.

12. In a labeling machine, means to feed an unactivated adhesive coated label in flat condition, means to shape the label to the contour of an article surface having a form other than flat, means to transmit the shaped label to the article surface, means to activate the adhesive material on such label after the latter has been shaped and during its transmittal to the article, and means for synchronously actuating said feeding means and said transmitting means to feed a label in flat condition and to transmit a shaped label to an article during the same time.

13. In a labeling machine, the combination of an article supporting means at a label applying station for positioning hollow articles in label receiving position, a vacuum device for delivering labels to the article comprising a support, a cylindrically-shaped vacuum head mounted on said support and projecting transversely therefrom, means separate from such head for shaping a flat label around the projecting cylindrical surface of said head, and means for actuating said device to carry such vacuum head with the thus shaped label thereon into the interior of the article at the label applying station.

14. In a labeling machine, means for supporting a source of label supply, means spaced from said source for supporting articles to be labeled, a pick-up station intermediate said source of label supply and said article support, means for transferring individual labels from said source to said pick-up station, and means for transporting a label delivered to said pick-up station from the latter to an article on said support, and means associated with said transporting means for activating the adhesive material on said label during its passage from said pick-up station to the article.

15. In a labeling machine, means for supporting a compacted supply stack of inactivated thermoplastic coated labels, means spaced from said stack for supporting articles to be labeled, a pick-up station intermediate said supply stack and said article support, a device for transferring individual labels from said stack to said pick-up station, the label engaging portion of said device being at substantially room temperature so as not to activate the adhesive material on said labels, and means for transporting a label delivered to said pick-up station from the latter to an article on said support, the label engaging portion of said transporting means being heated to a temperature such as will activate the adhesive material on such label during its passage from said pick-up station to the article.

16. In a labeling machine, means for supporting a source of label supply, means spaced from said source for supporting articles to be labeled, a pick-up station intermediate said source of label supply and said article support, a vacuum device for transporting a label delivered to said pick-up station from the latter to an article on said support, means for moving said transfer vacuum device and said transporting vacuum device in predetermined relationship, and means associated with said transporting vacuum device for activating the adhesive material on said label in its passage from said pick-up station to the article.

17. In a labeling machine, means for supporting a supply stack of labels having heat activatable adhesive material thereon, means spaced from said stack for supporting articles to be labeled, a pick-up station intermediate said label supply stack and said article support, a vacuum device for transferring individual labels from said stack to said pick-up station, the label engaging portion of said transfer device being at substantially room temperature so as not to activate the adhesive material on such labels, a vacuum device for transporting a label delivered to said pick-up station from the latter to an article on said support, means associated with said transporting vacuum device for supplying heat of a temperature to activate the adhesive material on such label in its passage from said pick-up station to the article, and means for moving said transfer vacuum device and said transporting vacuum device in predetermined relationship.

18. In a labeling machine, means for supporting a source of supply of labels coated with thermo-activatable adhesive, means spaced from said source for supporting articles to be labeled, a support located between said source and said article supporting means and spaced therefrom, a first label feeding device for removing and transferring individual labels from said source to said support, said first device operating at a temperature lower than the temperature required to activate the coating on said label, a second feeding device for transporting from said support and depositing on articles, the individual labels after said labels have been removed from said source by said first device, means to heat the thermo-activatable adhesive during the transport of the label by said second feeding device, whereby the adhesive is activated prior to the deposition of the label on the article and means for synchronously actuating said first and second feeding devices to transmit a label from said source to said spaced support and to transport a label from said spaced support to an article during the same time.

19. In a labeling machine, means for supporting a source of supply of labels coated with thermo-activatable adhesive, means spaced from said source for supporting articles to be labeled, feeding means for removing individual labels from said source and applying such labels to articles at said spaced supporting means, said feeding means including a label carrier capable of carrying a plurality of labels simultaneously, means on said carrier to heat the thermo-activatable adhesive coatings on such individual labels during the transport thereof from said source to said supporting means, said heating means being effective on a portion only of said carrier, and said feeding means including means for transferring a label from an unheated portion of said carrier to a heated portion thereof at a point separated from said source of supply and intermediate the latter and said article supporting means, whereby the condition of the adhesive coatings on such labels is substantially unchanged during the initial portion of their transport by said feeding means, and such adhesive coatings are activated prior to the deposition of the labels by said feeding means on the articles at said supporting means.

20. In a labeling machine, means for supporting a source of label supply, a label carrying device operable to transmit labels from said source of supply along a predetermined path, said device being constructed to carry two labels simultaneously and one portion of said device being unheated and another portion of said device being heated, and means coactable with said device for transferring a label from the unheated portion of said device to the heated portion thereof at a point spaced from said source of label supply.

21. In a labeling machine, means for supporting a source of label supply, a unitary label pick-up head operable to transmit labels from said source of supply along a predetermined path and having two label engaging portions for picking up and carrying labels, vacuum connections to each of said portions and one of such portions being unheated and the other portion heated, and means coactable with said head for transferring a label from the unheated portion of said head to the heated portion thereof at a point spaced from said source of label supply.

22. In a labeling machine, means for supporting a source of label supply, a unitary vacuum device operable to transmit labels from said source of supply along a predetermined path, said device having two label carrying portions and having means for heating one of said portions, said portions being constructed and arranged on said device so that the heat from the heated portion will not substantially affect the unheated portion thereof, and means coactable with said device for transferring a label from the said unheated portion thereof to the heated portion thereof at a point spaced from said source of label supply.

23. In a labeling machine, means for supporting a store of labels, a support for an individual label in spaced, predetermined position relative to said store, and a unitary vacuum device having a predetermined range of movement and operable to transmit simultaneously individual labels from said store and from said support along predetermined paths, said device having a label engaging portion constructed and arranged on said device to transport a label from said store to said support during the range of movement of said device in one direction and said device having a second label engaging portion constructed and arranged on said device to transport a label from said support along a predetermined path during the range of movement of said device in the same direction, *and means for rendering adhesive the label transported by said second label engaging portion after such label has been received by the latter and*

*before said second label engaging portion has completed its movement in the said direction.*

24. In a labeling machine, means for supporting a store of labels, a support for an individual label in spaced, predetermined position relative to said store, and a unitary vacuum device having a predetermined path of travel and having a label engaging portion constructed and arranged to coact with said store to remove a label therefrom during the travel of said device in one direction, and said device having a second label engaging portion constructed and arranged to coact with said support to remove a label therefrom during the travel of said device in the same direction, said first mentioned portion of said device being unheated and said second label engaging portion of said device being heated, whereby the label removed from said support is heated during the said travel of said device.

25. In a labeling machine, a support for a store of labels, a label supply station spaced from the store of labels on said support, an article supporting station spaced from said label supply station, a vacuum device arranged to travel from said supply station to said article supporting station, said device having a restricted vertical movement above said label supply station and having a label carrying surface shaped other than flat and substantially conforming to the shape of the article surface to which the label is to be applied, means for successively carrying individual flat labels from the store on said support to said supply station, and means at said supply station for shaping a flat label into conformity with said surface and for depositing such label on said surface.

26. In a labeling machine, a support for a store of labels, a label supply station spaced from the store of labels on said support, an article supporting station spaced from said label supply station, a vacuum device arranged to travel from said supply station to said article supporting station, said device having a restricted vertical movement above said label supply station and having a label carrying surface shaped other than flat and substantially conforming to the shape of the article surface to which the label is to be applied, a second vacuum device for successively carrying individual labels from the store on said support to said supply station and having a relatively flat label carrying surface, means at said supply station for shaping a flat label into conformity with the label carrying surface of said first mentioned vacuum device and for depositing such label on said carrying surface, and means for synchronously actuating said first and second mentioned vacuum devices.

27. In the art of applying labels to articles, that improvement which comprises removing successive terminal labels from a store of labels having coatings of heat activatable adhesive material and transferring such labels successively in spaced, independent relation without the application of heat to a station spaced from said store, depositing such spaced labels in a successive fashion at said station and on their adhesive coated surfaces, successively picking up and transporting the labels from said station to a label applying station and during such travel to the applying station, subjecting the labels to such heat as to activate the coatings thereon and then successively applying the labels to articles.

28. In the art of applying labels to articles, that improvement which comprises removing successive terminal labels from a store of labels having coatings of heat activatable adhesive material, transferring such labels in a successive fashion and in a flat condition without the application of heat to a station spaced from said store, reshaping the labels at such station into a shape other than flat and substantially conforming to the shape of the article surface to which the label is to be applied, successively transporting the reshaped labels to a label applying station and during such travel to the applying station subjecting the labels to such heat as to activate the coatings thereon, and then successively applying the labels to articles.

29. In the art of applying labels to articles, that improvement which comprises removing successive terminal labels from a store of labels having coatings of heat activatable adhesive material, transferring such labels in a successive fashion without the application of heat to a station spaced from said store, depositing such labels in a successive fashion at such station and on their adhesive coated surfaces, maintaining a label at such station other than by the adhesive coating thereon and while so maintained reshaping the label into a shape other than flat, and substantially conforming to the shape of the article surface to which the label is to be applied, successively transporting the reshaped labels to a label applying station and during such travel to the applying station subjecting the labels to such heat as to activate the coatings thereon, and then successively applying the labels to articles.

30. In a labeling machine, means to support a compacted supply of inactivated thermoplastic coated labels, means spaced from said supply for supporting articles to be labeled, means for removing individual labels from said compacted supply and for applying such labels to articles on said support, said last mentioned means including a label removing device operative to remove an individual label from such compacted supply and having a temperature lower than the activating temperature of the thermoplastic coating on the label, a label applying device having a temperature higher than the activating temperature of the thermoplastic coating on such labels and means coacting with said removing device and said applying device to transfer a label from said removing device to said applying device.

31. In the art of applying labels to articles, that improvement which comprises removing successive terminal labels from a store of labels having coatings of heat activatable adhesive material, transporting such labels successively, in spaced, independent relation over a portion of the path of travel from said store of labels to the articles to be labeled without the application of heat to such labels, then while transporting the labels in such successive fashion over the balance of such path to the articles to be labeled and without interruption of their movement over such balance of the path, successively subjecting them for a predetermined interval to such heat as to activate the coatings thereon, and then successively applying the labels to articles.

32. In a labeling machine having article supporting means at a label supplying station for positioning hollow articles in label receiving position, a vacuum head for feeding labels into the interior of such articles, said head comprising an elongated cylindrically-shaped casing having a cross-sectional area less than the cross-sectional area of the interior of the article, having a plurality of openings provided in the cylindrical wall thereof and having a vacuum connection at one end thereof to cause a label to adhere to the cylindrical wall thereof, means separate from said head to provide a label around the perforated cylindrical wall of said head, and means for actuating said head to insert the cylindrical wall thereof with a label thereon into the interior of an article at the label applying station.

33. In a labeling machine having article supporting means at a label supplying station for positioning hollow articles in label receiving position with the opening thereof in the line of movement of a label feeding device, a label feeding device comprising an elongated vacuum head, a member supporting one end of said head so that the body of said head protrudes from said member, means connected to said supporting member for moving said head in the direction of protrusion of the body thereof and into the interior of articles at the label applying station, and means separate from said head to provide a label on the label carrying surface of the protruding body of said head.

34. In a labeling machine, having means to support a supply of labels and means to support articles to be labeled, the combination of means for transmitting labels having coatings of heat activatable adhesive material and in successive, spaced independent relation to such article support and for applying such labels to articles at such support, said transmitting and applying means including a label carrying vacuum device and means for heating the label carrying surface of said vacuum device at a temperature higher than room temperature to activate the adhesive material on such labels, and means for feeding such labels in successive, spaced, independent relation from said label supply support to said transmitting and applying means, said last mentioned means comprising a label carrying vacuum device having an unheated label carrying surface.

35. In a labeling machine, having means to support a supply of labels and means to support articles to be labeled, the combination of means for transmitting labels having coatings of heat activatable adhesive material and in successive, spaced independent relation to such article support and for applying such labels to articles at such support, said transmitting and applying means including a label carrying device and means for heating the label carrying surface of said device at a temperature higher than room temperature to activate the adhesive material on such labels, and means for feeding such labels in successive, spaced, independent relation from said label supply support to said transmitting and applying means, said last mentioned means comprising a label carrying device having an unheated label carrying surface.

36. In a labeling machine having means to support a supply of labels and means to support articles to be labeled, of means for feeding labels having coatings of heat activatable adhesive material from said label support to said article support, said feeding means comprising a unitary vacuum device composed of two vacuum heads operable in succession on each label fed from such label supply support to said article support, means for transferring a label from one vacuum head to the other, and means for heating said other vacuum head.

37. A labeling machine such as defined in claim 36, in which said heated vacuum head has a label carrying surface of substantially greater area than that of said unheated vacuum head.

38. In a labeling machine for handling labels having heat activatable adhesive material thereon, a support for a source of supply of such labels, a support for an article to be labeled spaced from said supply support, a first label carrying device adapted to receive a terminal label from such supply and to carry such label over a portion of the path from such supply to the article, a second label carrying device adapted to carry such label over the balance of said path from such supply to the article and to apply such label to the article, said first label carrying device being at a temperature lower than the activating temperature of the adhesive material on such label, and said second label carrying device being provided with heating means to heat the adhesive material to a temperature above the activating temperature thereof and to apply such label under pressure to said article.

39. In a labeling machine for handling labels having heat activatable adhesive material thereon, a support for a source of supply of such labels, a support for an article to be labeled spaced from said source of supply, means for feeding such labels from such source of supply to said article support including a first label carrying device adapted to carry a label over a portion of its path of feed from such supply to the article, and a second label carrying device adapted to carry such label over the balance of such path and to apply it to the article, said first label carrying device being at a temperature so as not to activate the adhesive material, means provided on said second label carrying device to heat the adhesive material on such label so as to activate the same, and means connected to said second label carrying device and operative to cause the latter to apply the activated label under pressure to the article.

40. In a labeling machine for handling labels having heat activatable adhesive material thereon, a support for a source of supply of such labels, a support for an article to be labeled spaced from said source of supply, means for feeding such labels from such source of supply to said article support including a first suction device adapted to carry a label over a portion of its path of feed from such supply to the article, and a second suction device adapted to carry such label from place of discharge thereof by said first suction device to the article, said first suction device being at a temperature lower than the activating temperature of the adhesive material on such label, and means associated with said second suction device for supplying heat of a temperature to actuate the adhesive material on such label in its passage to the article.

41. In a labeling machine for handling labels having heat activatable adhesive material thereon, a support for a source of supply of such labels, a support for an article to be labeled spaced from said source of supply, means for feeding such labels from such source of supply to an article on said article support including a first device for releasably holding individual labels and adapted to carry a label over a portion of its path of feed from such supply to the article, and a second device for releasably holding individual labels and adapted to carry such label from the place of discharge thereof by said first device to the article, said first device being at a temperature lower than the activating temperature of the adhesive material on such label, means associated with said second device for supplying heat of a temperature to activate the adhesive material on such label in its passage to the article, and means for causing said second device to deposit such label on the article.

42. In a labeling machine for handling labels having heat activatable adhesive material thereon, a support for a source of supply of such labels, a support for an article to be labeled spaced from said source of supply, means for feeding such labels from such source of supply to an article on said article support, including a first device for supporting individual labels and adapted to carry a label over a portion of its path of feed from such supply to an article, and a second device for supporting individual labels and adapted to carry such label from the place of discharge thereof by said first device to the article, said first device being at a temperature lower than the activating temperature of the adhesive material on such label, a label engaging surface on said second device, means provided on said second device for supplying to said label engaging surface heat of a temperature to activate the adhesive material on such label in its passage to the article, means for causing said first and second devices to move so as to carry such label over a predetermined path to a position overlying the part of the article to which such label is to be applied, and means for moving the label engaging surface of said second device from such position towards such article part to adhere such label to the article under pressure.

*43. In a machine for forming and applying sheets to articles, means for supporting a supply stack of sheets, means for supporting articles to which the sheets are to be applied, a sheet forming device located between said stack supporting means and said article supporting means, a pair of sheet carrying suction heads associated with said forming device, means for synchronously reciprocating one of said heads between the supply stack and said forming device and the other of said heads between such device and said article support, suction means associated with said heads and said forming device and operable to control the suction applied to the sheets by said heads and said forming device, whereby the sheets are removed successively from the supply stack by one of said heads to said forming device and formed and held formed thereat, then removed therefrom and maintained in formed condition by the other of said suction heads and applied by the latter to an article on said article supporting means.*

*44. A machine for forming and applying sheets to articles, comprising a holder for a supply of sheets, a sheet forming device spaced therefrom and having a configuration such as to impart the desired formation to a sheet, an article supporting means spaced from said forming device, a pair of reciprocable suction heads, said heads being in tandem and one of said heads having a surface shaped in correspondence with the configuration of said forming device, one of said heads being arranged to ply between said sheet supply holder and said forming device, and the other of said heads being arranged to ply between said forming device and said article supporting means, controlled suction means associated with said heads and said forming device and operable therewith to remove a sheet from said supply holder, form and hold such removed sheet on said forming device, remove the formed sheet from said device, maintain the sheet in formed condition and apply the formed sheet to an article on said article supporting means.*

*45. In a machine for forming and applying sheets to articles, means for supporting a supply of sheets, a forming device spaced from said supporting means and constructed to impart a desired formation to such sheets, an article supporting means spaced from said forming device, a pair of synchronously reciprocable suction heads, one of said suction heads having a surface contoured in correspondence with the formation to which such sheets are to be reshaped and adapted to cooperate with said forming device to conform a sheet therebetween, one of said heads being reciprocable to transfer a sheet from said sheet support to said forming device and the other of said heads being reciprocable to transfer a formed sheet from said forming device to an article on said article supporting means, and to apply such formed sheet to the article.*

*46. In a machine for forming and applying sheets to articles, means for supporting a supply of sheets, a forming device spaced from said supporting means and constructed to impart a desired formation to such sheets, an article supporting means spaced from said forming device, a pair of synchronously reciprocable suction heads, one of said suction heads having a surface contoured in correspondence with the formation to which such sheets are to be reshaped and adapted to cooperate with said forming device to conform a sheet therebetween, one of said heads being reciprocable to transfer a sheet from said sheet support to said forming device and the other of said heads being reciprocable to transfer a formed sheet from said forming device to an article on said article supporting means and to apply such formed sheet to the article, and means for rendering adhesive the article engaging surface of a formed sheet during its transit from said forming device to said article supporting means.*

*47. In a machine for forming and applying sheets to articles, means for supporting a supply of sheets, a support located at a point of application at a distance from said supply for supporting an article in sheet receiving position, a forming station including a forming device upon which the sheets are formed located between said sheet support and said point of application, a suction head for removing individual sheets from said supply, means for shifting said suction head to move a sheet carried thereby into forming engagement with said device, a second suction head for removing individual formed sheets from said forming device and having a face thereof contoured to retain the sheets in formed position, means connecting said second suction head with the shifting means of said first mentioned suction head effective to move a formed sheet carried by said second section head toward said article support, means for rendering adhesive the article engaging surface of the formed sheet during its transit from said forming device to said article support, and means associated with said suction head for effecting application of the formed and adhesively coated sheet to the article on said article support*

*48. In a machine for forming and applying sheets to articles, a forming device having a forming surface constructed to distort a sheet being reshaped thereon, means including a suction head coacting with said forming surface to deliver a sheet to said surface to reshape the sheet and to hold the reshaped sheet by suction* on said surface, a second suction head having a surface conformed to fit the formed sheet operable to transport the latter from said device and apply such formed sheet to an article, and means for synchronously moving said suction heads into and out of cooperative association with said forming device.

49. In a machine for forming and applying sheets to articles, means for supporting a supply of sheets, a forming device having a forming surface adapted to receive said sheets for forming, means including suction means operable to move a terminal sheet from said supply to said surface and to form the removed sheet on said surface, means for supporting articles, a second suction means conformed to fit the formed sheet and operable to move the latter from said forming device to said article supporting means and to apply the formed sheet to an article on such supporting means.

50. In a machine for forming and applying sheets to articles, means for supporting a supply of sheets, a forming device having a forming surface adapted to receive said sheets for forming, means including suction means operable to move a terminal sheet from said supply to said surface and to form the removed sheet on said surface, means for supporting articles, a second suction means conformed to fit the formed sheet and operable to move the later from said forming device to said article supporting means and to apply the formed sheet to an article on such supporting means, means joining said first and second suction means, and means for imparting reciprocating movement to said joining means.

51. In a machine for forming and applying sheets to articles, means for supporting a supply of sheets, an article support spaced therefrom, a sheet forming device intermediate said article support and said sheet supporting means, and a pair of synchronously and reciprocally movable suction heads simultaneously operable, respectively, to remove a sheet from said sheet supporting means and a formed sheet from said forming device and simultaneously and respectively transfer and apply said removed sheet and said formed sheet to said forming device and to an article on said article supporting means, said suction device operating between said forming device and said article supporting means having a sheet carrying surface different from said other suction device and conforming in shape to the forming surface of said forming device.

52. In a machine for applying sheets to articles, means for conveying a sheet from one terminal position over a predetermined path to another terminal position and for applying such sheet to an article at said latter position, means including said conveying means as a part thereof operable to bend and form such sheet at a point in said path intermediate said terminal positions, and means for rendering adhesive a surface of such sheet following said bending and forming operation and before applying such formed sheet to an article at said other terminal position.

53. In a machine for forming and applying sheets to articles, means for supporting a supply of sheets, a forming device having a sheet reshaping surface adapted to receive said sheets for forming, means for transferring a sheet from said sheet supporting means to said surface and for forming the transferred sheet on said surface, means for supporting articles, and means having a sheet carrying surface conformed to fit the formed sheet and operable to move the latter from said forming device to said article supporting means and to apply the formed sheet to an article on such supporting means.

54. In a machine for forming and applying sheets to articles, means for supporting a supply of sheets, a forming device having a sheet reshaping surface adapted to receive said sheets for forming, means for transferring a sheet from said sheet supporting means to said surface, means for forming the transferred sheet on said surface, means for supporting articles, and means having a sheet carrying surface conformed to fit the formed sheet and operable to move the latter from said forming device to said article supporting means and to apply the formed sheet to an article on such supporting means.

55. In a machine for forming and applying sheets to articles, means for supporting a supply of sheets, a forming device having a sheet reshaping surface adapted to receive said sheets for forming, means for transferring a sheet from said sheet supporting means to said surface, means for supporting articles, and means having a sheet carrying surface conformed to the shape of the forming surface of said forming device and operable to form the transferred sheet on the surface of said forming device, to move the formed sheet from said forming device to said article supporting means and to apply the formed sheet to an article on such supporting means.

56. In the art of forming and applying sheets to articles, that improvement which comprises removing successive terminal sheets from a store of sheets, transferring such sheets in a successive fashion to a station spaced from such store, reshaping the sheets at such station into the form desired for application to the articles, successively transporting the reshaped sheets from such station to an applying station and during such transporting step maintaining the sheets in their reshaped form, and at the end of such transporting step applying the reshaped sheets to articles at the applying station.

57. In the art of forming and applying sheets to articles, that improvement which comprises removing successive terminal sheets from a store of sheets, transferring such sheets in a successive fashion to a station spaced from such store, reshaping each sheet at such station into the form desired for application to an article and holding such sheet formed at such station, then successively transporting the reshaped sheets from such station to an applying station while maintaining them in their reshaped form by pressure, and at the end of such transporting step successively applying the reshaped sheets to articles at the applying station.

58. In the art of forming and applying sheets to articles, that improvement which comprises removing successive terminal sheets from a store of sheets, transferring such sheets in a successive fashion to a station spaced from such store while maintaining sheets under the control of suction, successively reshaping the sheets at such station by bending spaced portions of each sheet away from the central portion thereof and holding each sheet in its formed condition by suction at such station, then successively transporting the reshaped sheets from such station to an applying station while maintaining them in their reshaped form with the aid of suction, and while such sheets are being so transported from such inter-

*mediate station to said applying station rendering the same capable of being adhesively adhered to an article, and then successively applying the formed sheets to articles at the applying station.*

GEORGE W. VON HOFE.

References Cited in the file of this patent or the original patent

UNITED STATES PATENTS

| Number | Name | Date |
|---|---|---|
| 1,705,512 | Warga | Mar. 19, 1929 |
| 1,947,610 | McNamara | Feb. 20, 1934 |
| 2,070,390 | Biggs | Feb. 9, 1937 |
| 2,129,686 | Gray | Sept. 13, 1938 |
| 2,227,816 | Von Hofe | Jan. 7, 1941 |
| 2,247,623 | Von Hofe | July 1, 1941 |
| 2,279,724 | Von Hofe | Apr. 14, 1942 |
| 2,289,237 | Brown | July 7, 1942 |
| 2,623,442 | Thaxton | Dec. 30, 1952 |